United States Patent [19]

Fussell

[11] Patent Number: 5,130,954
[45] Date of Patent: Jul. 14, 1992

[54] LEADER CABLE ANCHOR FOR A GEOPHONE

[76] Inventor: Don L. Fussell, 16818 Bobcat Trail, Cypress, Tex. 77429

[21] Appl. No.: 733,607

[22] Filed: Jul. 22, 1991

[51] Int. Cl.$^5$ ............................................. G01V 1/16
[52] U.S. Cl. .................................. 367/188; 181/122
[58] Field of Search ............... 181/122; 367/178, 188, 367/191; 174/52.1-52.5, 65 R, 656

[56] References Cited

U.S. PATENT DOCUMENTS

| | | | |
|---|---|---|---|
| 2,783,298 | 2/1957 | Brown et al. | 367/178 |
| 3,332,057 | 7/1967 | Pavey, Jr. | 367/188 |
| 3,786,410 | 1/1974 | Hazelhurst | 367/177 |
| 3,931,453 | 1/1976 | Hall, Jr. | 367/188 |
| 3,932,834 | 1/1976 | Sutherland | 367/188 |
| 3,993,859 | 11/1976 | McNeel | 367/188 |
| 4,204,188 | 5/1980 | Weichart et al. | 367/154 |
| 4,317,185 | 2/1982 | Thigpen et al. | 367/130 X |
| 4,438,292 | 3/1984 | Woodall | 367/188 X |

*Primary Examiner*—Brian S. Steinberger
*Attorney, Agent, or Firm*—Dodge, Bush, Moseley & Riddle

[57] ABSTRACT

In accordance with illustrative embodiments of the present invention as disclosed herein, a leader cable is anchored to a post on the upper end of a geophone case having a spike on its lower end that penetrates the ground to hold the case in an upright postion. The anchor is formed by a continuous stress member in the cable that is looped around the post to isolate the electrical conductors in the cable from strains imposed on the cable. The post can be an integral part of a block located at the upper end of the case, or a bobbin that is captured by a cap that closes the top of the case.

7 Claims, 1 Drawing Sheet

LEADER CABLE ANCHOR FOR A GEOPHONE

FIELD OF THE INVENTION

This invention relates generally to geophones and to leader cables therefor, and particularly to a unique leader cable having a stress member that is anchored to a geophone case in a manner that prevents breaking or disruption of electrical connections to the geophone during field use.

BACKGROUND OF THE INVENTION

Geophones are seismic detectors that are spaced out at various points on the ground to sense upcoming reflections of acoustic waves that are produced by a seismic source. The geophones are electrically connected to a leader cable which goes to a recorder that produces traces which are representative of the outputs of the phones. The recording can be used to make stratigraphic maps that show the various layers in the earth where there is a substantial impedance mismatch, and such maps are highly useful in prospecting for underground oil and/or gas deposits.

A geophone typically has a spike on the bottom of its case which is pushed into the ground in order to locate the phone at a selected point. When the seismic operation is completed and the phones and leader cable are being gathered up for use elsewhere, it is not uncommon for personnel to go along the line and jerk the spikes of the phones out of the ground, using the leader cable to do so. The jerk force on the cable tends to break conductor wires and to disrupt electric connections, which will render a phone inoperable until repairs are made. Such repairs may not be easy to make in the field, in which case the phones or cable are out of operation until they can be returned to a shop for repairs.

Various proposals have been made for minimizing or eliminating this problem. For example, the Hall U.S. Pat. No. 3,931,453, the Sutherland U.S. Pat. No. 3,932,834 and the Woodall U.S. Pat. No. 4,438,292 each show the typing of a knot in the leader cable inside the top of the geophone housing where the cable enters to anchor the cable ends therein, so that jerking on it will be less likely to disturb the electrical connectors between the conductor wires and the geophone terminals. Of course, the knotting of an electrical cord inside the body of a male or a female electrical plug or socket has been a common practice. Although this approach has been widely used, it has the disadvantage that the small conductor wires in a leader cable are not good strength members, so that jerking forces can break them in tow in the region ahead of the knot. Moreover, a knot can become so tight that it is not easily undone, and the end portion of the leader cable containing the know will have to be cut off during repair. Generally speaking, if the leader cable itself is not a good strength member, then simply typing a knot in it as a stop against outward movement is not considered to be an optimum solution to the problem.

The general object of the present invention is to provide a new and improved leader cable and anchoring structure to a geophone which obviates the problems mentioned above.

SUMMARY OF THE INVENTION

This and other objects are attained in accordance with the concepts of the present invention through the provision of a geophone case having a spike or other ground penetrating means on its lower end, and an anchor means adjacent its upper end. The leader cable includes a plurality of insulated conductors and a stress member layed within an outer sheath. At a point in the cable where a connection is to be made between one or more of the conductors and the terminals of the geophone, a portion of the sheath is removed to expose a length of the conductors and the stress member. One or more loops are formed in the stress member which are positioned around the anchor means, and appropriate connections are made of the conductors to the phone terminals. The anchor means can be a post that is fixed to the top of the case, or a bobbin that is captured by a cap that closes the top of the case. The loops in the stress member provides a firm attachment of the leader cable so that the stress member takes the strain forces that are produced when the leader cable is jerked, or pulled, to remove the spike from the ground, and isolates the phone terminal connections therefrom. A small leader cable having a plurality, for example three, of insulated conductors that are layed together with a stress member inside of a nonconductive sheath also is unique.

BRIEF DESCRIPTION OF THE DRAWINGS

The present invention has other objects, features and advantages which will become more clearly apparent in connection with the following detailed description of a preferred embodiment, taken in conjunction with the appended drawings in which.

DETAILED DESCRIPTION OF PREFERRED EMBODIMENTS

Figures 1, 2:
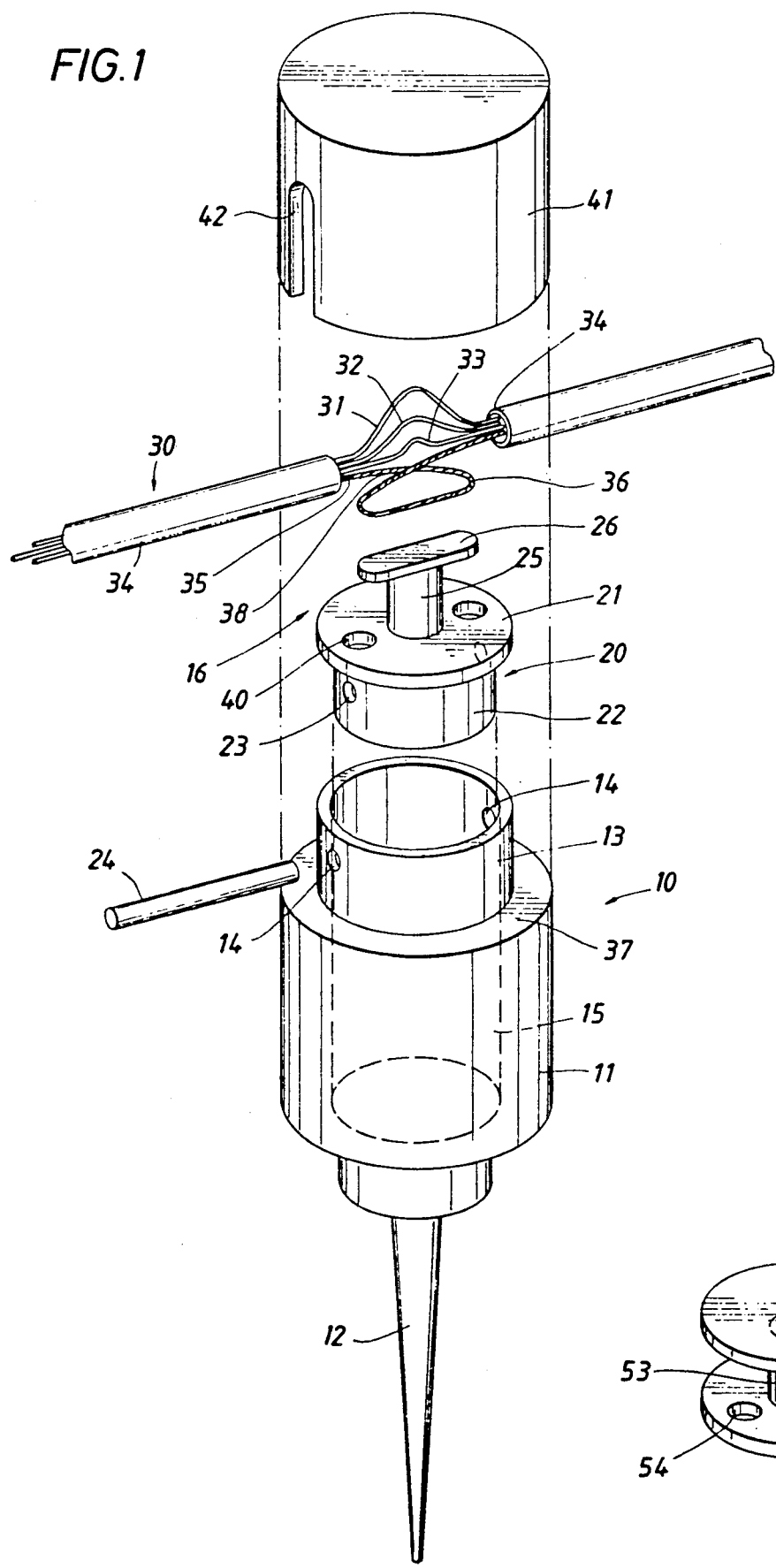
FIG. 1 is an isometric, exploded view of the geophone case assembly and its connection to the leader cable of the present invention.
FIG. 2 is an isometric view of another embodiment of an anchor for the stress member of the leader cable to a geophone case assembly.

With reference to FIG. 1, a geophone assembly 10 includes a tubular case 11 which is closed at its lower end. An elongated spike 12 is attached to, or formed together with, such lower end. In use, the spike 12 is pushed into the ground to support the case 11 in an upright position. The case 11 has an internal cavity 15 that receives a geophone (not shown) which detects acoustic waves and produces an output that is representative thereof. A reduced diameter portion 13 is formed at the upper end of the case 11, such portion having diametrically opposed holes 14 through its walls.

One embodiment of an anchor 16 means includes a block 20 having a disc-shaped upper wall 21 and a depending cylindrical skirt 22 that is sized to fit inside the upper portion 13 of the case 11. The skirt 22 also has opposed holes 23 which will align with the holes 14 when the skirt is inserted into the portion 13. Then a pin 24 can be inserted through the holes 23 and 14 to attach the anchor block 20 to the case 11. An upstanding post 25 is fixed to the center of the wall 21, and an elongated, transversely arranged plate 26 that is fixed to the top of the post. The post 25 provides an anchor point for the stress member of a leader cable 30.

The leader cable 30 has, in this example, three insulated conductors 31-33 which are layed within a sheath 34 together with a stress member 35. The stress member 35 preferably has parallel strands made of "Kevlar", which has a very high strength-to-weight ratio compared to other materials. When one or more of the conductors in the leader cable 34 are to be electrically connected to the terminals of the geophone that is housed in the cavity 15 inside the case 11, a length of the sheath 34 is removed, as shown, to expose the conductors 31-33 and the stress member 35. The stress member 35 is formed into one or more loops 36 as shown, and such loops are positioned around the post 25 below the plate 26. The stress member 35 remains continuous with respect to the leader cable 30, and is not cut or otherwise terminated. One or more of the conductors 31-33 then is cut and connected to the terminals of the phone through suitable holes 40. A cap 41 is fitted over the anchor block 20 and the case portion 13 and down against the shoulder 37 on the case 11 to complete the assembly, preferably in a substantially moisten-proof manner. The cap 41 has side slots 42 that slip over the ends of the leader cable 30 as the cap is moved down against the shoulder 37.

Another embodiment of a stress member anchor is shown in FIG. 2. Here the anchor is in the form of a bobbin 50 having upper and lower flanges 51, 52 that are joined by a central post 53. Holes 54 can be provided in the lower flange 52 for use in terminating the conductor wires 31-33. This embodiment can be used in place of the post 25 and plate 26 in FIG. 1. The stress member 36 is looped around the post 53 to provide an anchor, and the bobbin 50 is placed above the block 20 and captured by the cap 41.

The mode of operation of the assembly 10 will now be apparent in view of the foregoing description. When a sudden or a gradual strain is taken in the leader cable 30 in order to pull the spike 12 out of the ground, such strain is taken by the stress member 35 and its anchor point at the posts 25 or 53, which isolates the electrical conductors 31-33 and their connections to the geophone therefrom. Thus the connections and the conductors will not be damaged or pulled in two on account of rough handling. The security of the anchor of the stress member 35 to the posts 25 or 53 can be assured in several ways, for example by looping the member a plurality of times around the posts, or by twisting the loop 36 several turns at the crossing point 38 after several loops are tightened around the posts. Also the loop can be formed into several types of knots around the posts 25 or 53, for example a cat's paw-type knot or a slip knot, while the stress member 35 remains continuous. As used herein, the term "loop" includes a knot since most if not all knots are formed with at least one loop.

It now will be recognized that a new and improved leader cable anchoring to a geophone case has been disclosed. Since certain changes or modifications can be made in the disclosed embodiment without departing from the inventive concepts involved, it is the aim of the following claims to cover all such changes and modifications falling within the true spirit and scope of the present invention.

What is claimed is:

1. An anchoring apparatus to attach a leader cable having a plurality of conductors and a stress member to a geophone case assembly, comprising: outwardly extending elongated means in said case assembly providing an anchor point; and loop means in said stress member extending around said outwardly extending elongated means to isolate said conductors from strains imposed on said cable; and means for preventing outward movement of said loop means along said outwardly extending elongated means.

2. The apparatus of claim 1 wherein said case assembly includes an open-topped body, and a disc having a depending skirt that fits into said open-topped body, said outwardly extending elongated means including an upstanding post on the opposite side of said disc from said skirt.

3. The apparatus of claim 2 further including means for fastening said skirt to said open-topped body.

4. The apparatus of claim 1 wherein said outwardly extending elongated means includes a bobbin having upper and lower flanges joined by a post, said bobbin being positioned adjacent the upper end of said case; and cap means for closing the upper end of said case and for capturing said bobbin therein.

5. A method for anchoring a leader cable having a plurality of insulated conductors and a stress member enclosed in a sheath to a geophone assembly, comprising the steps of: providing an outwardly extending elongated anchor member adjacent the outer end of said case; removing a section of said sheath to expose a length of said conductors and said stress member; forming at least one loop in said stress member; positioning said loop around said outwardly extending elongated member; connecting at least one of said conductors to the terminals of a geophone that is housed in said case assembly and limiting outward movement of said loop along said outwardly extending elongated member.

6. The method of claim 5 wherein said loop forming step includes looping said stress member into a knot around said outwardly extending elongated member.

7. The method of claim 6 wherein said geophone case assembly includes a cap arranged to close the top of said case, and in which said anchor member providing step includes positioning a bobbin on top of said case, the post of said bobbin providing said outwardly extending anchor member, and capturing said bobbin with a cap that closes the top of said case.

* * * * *